United States Patent [19]

Muller et al.

[11] 3,997,405

[45] Dec. 14, 1976

[54] METHOD AND ARRANGEMENT FOR USE WITH BIOCHEMICAL REACTIONS

[75] Inventors: Hans Müller, Erlenbach; Felix Müller, Stafa, both of Switzerland

[73] Assignee: Hans Müller, Erlechenbach, Zurich, Switzerland

[22] Filed: Mar. 24, 1975

[21] Appl. No.: 561,456

[30] Foreign Application Priority Data

Mar. 26, 1974 Switzerland .................. 4291/74

[52] U.S. Cl. .................................. 195/104; 195/139
[51] Int. Cl.² ...................................... C12B 1/00
[58] Field of Search ............ 195/1, 104, 108, 109, 195/125, 139, 142, 143, 28 R; 210/12

[56] References Cited

UNITED STATES PATENTS

| | | | |
|---|---|---|---|
| 3,384,491 | 5/1968 | Guenther et al. | 195/28 R |
| 3,711,372 | 1/1973 | Donnelly | 195/1 |

Primary Examiner—R. S. Penland
Attorney, Agent, or Firm—Michael J. Striker

[57] ABSTRACT

Heat liberated during an exothermic biochemical reaction is utilized in carrying out an operation requiring energy such as drying the product obtained from the reaction or sterilizing the substrate used for the reaction. The liberated heat is absorbed by a vaporizable cooling medium for transfer to the operation requiring energy. Alternatively the temperature of the cooling medium subsequent to the absorption of heat thereby is raised by compressing the vaporized cooling medium. The heating cooling medium is used to carry out the operation requiring energy. An arrangement which includes a bioreactor is also disclosed and includes heat pump means for permitting utilization of heat liberated during an exothermic biochemical reaction in the performance of an operation requiring energy.

17 Claims, 2 Drawing Figures

METHOD AND ARRANGEMENT FOR USE WITH BIOCHEMICAL REACTIONS

BACKGROUND OF THE INVENTION

The invention relates generally to a method and an arrangement for use with biochemical reactions.

In biochemical technology, the current trend is towards the ever-increasing use of biochemical reaction, e.g., fermentations, which are very strongly exothermic and wherein microorganisms are utilized which achieve their optimum growth at higher temperatures (thermophilic strains, 40°–50° C). The considerable quantities of heat generated during these reactions are, in accordance with past and current practice, dissipated to the surrounding atmosphere unused by means of large amounts of cooling water.

Evidently, large quantities of energy are wasted in this manner so that improvements in the state of the art are desirable.

SUMMARY OF THE INVENTION

It is, accordingly, a general object of the invention to provide a novel method and a novel arrangement for use with the biochemical reactions.

Another object of the invention is to provide a method and an arrangement which enable at least a portion of the heat liberated during biochemical reactions to be utilized.

A further object of the invention is to provide a method and an arrangement which enable the efficiency of processes which include a biochemical reaction to be increased over that obtainable heretofore.

The foregoing objects, and others which will become apparent hereinafter, are achieved in accordance with the invention. One aspect of the invention relates to a process which includes an exothermic biochemical reaction. In such a process the invention provides for the improvement which comprises performing an energy-absorbing function utilizing a heat quantity liberated during the biochemical reaction.

An embodiment of the invention contemplates for the liberated heat quantity to be absorbed by a cooling medium which is used for dissipating heat liberated during the biochemical reaction. Different possibilities exist here.

One possibility resides in that the temperature of the cooling medium is increased subsequent to the absorption of the liberated heat quantity thereby but prior to the utilization of the heat quantity in performing the energy-absorbing function or operation. After the temperature of the cooling medium has been raised, the latter may be used in carrying out the energy-absorbing function, being conveyed to the location where this function is performed if necessary. With respect to increasing the temperature of the cooling medium, a favorable possibility involves selecting a cooling medium which is capable of existing in a liquid state prior to absorption of the liberated heat quantity thereby but which is able to undergo vaporization during absorption of the liberated heat quantity. Here, an increase in temperature of the cooling medium subsequent to the absorption of the liberated heat quantity thereby may be effected by compressing the cooling medium. It is possible for the compression to cause condensation of the vaporized cooling medium although this need not occur. The increase in temperature of the cooling medium may advantageously be effected by means of a heat pump.

Another possibility for the embodiment of the invention under consideration resides in that the liberated heat quantity absorbed by the cooling medium is transferred therefrom to another medium and thereafter utilized in performing the energy-absorbing function or operation. The transfer of the liberated heat quantity from the cooling medium to the other medium may, for example, serve to increase the temperature of the latter. In any event, subsequent to the transfer of the liberated heat quantity, the other medium may be used in carrying out the energy-absorbing function, being conveyed to the location where this function is performed should this be necessary. For the purpose of transferring the liberated heat quantity from the cooling medium to the other medium it is possible here also to select the cooling medium such that it is able to exist in a liquid state prior to absorbing the liberated heat quantity but is capable of undergoing vaporization during absorption of this heat quantity. In such an event, the cooling medium may be compressed and condensed after absorption of the liberated heat quantity for transfer of the latter to the other medium. The transfer of the liberated heat quantity is advantageously effected by means of a heat pump.

It will be appreciated that the preferred possibilities outlined above are merely representative of the different ways in which it is possible to effect utilization of a heat quantity liberated during a biochemical reaction in an energy-absorbing function or operation.

It may be mentioned here that, where a heat pump is used in either of the cases presented above, this may be utilized for conveying the cooling medium away from the location at which the biochemical reaction takes place. On the other hand, it is possible for the heat pump to convey the cooling medium to the location at which the biochemical reaction occurs and, of course, for the heat pump to both convey the cooling medium away from the location at which the biochemical reaction takes place and convey the cooling medium to this location.

Similarly, where a heat pump is used for the case in which the liberated heat quantity is transferred from the cooling medium to another medium, the heat pump may be utilized for conveying the latter medium to the location where it is required for the energy-absorbing function. The heat pump may also be utilized for conveying the other medium away from the location where it is required for the energy-absorbing function or for both conveying the other medium to such location and conveying this medium away therefrom.

According to an advantageous embodiment of the invention, the liberated heat quantity is used as an additional energy source in the process which includes the biochemical reaction, that is, the liberated heat quantity is used as an additional energy source in the same process from which it is derived.

The biochemical reaction may be effective for forming a liquid-containing product. It may be desirable to remove all or part of the liquid from the product and, in such an event, the energy-absorbing function or operation in which the liberated heat qunatity is utilized may involve the removal of liquid from the product. It may be mentioned here that the product may be an end product. The liquid contained in the product may include water, for example. It will thus be seen that the liberated heat quantity may be utilized in the drying of a product obtained from the biochemical reaction. The removal of liquid from the product may require heating the same to a sufficiently high temperature and this may be achieved using the liberated heat quantity.

The removal of liquid from the product may be carried out in a vacuum, that is, at an underpressure. In such an event, it is favorable for the removal of liquid from the product to be performed in a vacuum dryer.

The biochemical reaction may be carried out on or with a suitable substrate. It may be desirable or necessary to sterilize this substrate prior to carrying out the biochemical reaction therewith. If this should be the case, the energy-absorbing function in which the liberated heat quantity is utilized may involve sterilization of the substrate. Thus, the liberated heat quantity may be used in heating the substrate so as to permit the latter to be sterilized.

It will be self-understood that the liberated heat quantity may be used for both the removal of liquid from the product obtained by virtue of the biochemical reaction and the sterilization of the substrate utilized for this reaction.

The biochemical reaction may be performed in a bioreactor, that is, a reactor which is adapted for carrying out biochemical reactions, which has associated with it at least one energy-absorbing accessory. In other words, the biochemical reaction may be carried out in a bioreactor which is connected with one or more auxiliary pieces of equipment, other than a dryer for the product of the biochemical reaction and a sterilization chamber for the substrates, in one manner or another. Here, it is possible to utilize the liberated heat quantity in the operation of the accessory or accessories. It will be appreciated that, aside from its use in the operation of such accessories, the liberated heat quantity may further be used in the removal of liquid from the product obtained as a result of the biochemical reaction and/or in the sterilization of the substrate which is utilized for the biochemical reaction.

Another aspect of the invention relates to an arrangement which includes a bioreactor. In such an arrangement, the invention provides for the improvement which comprises means for permitting utilization of heat quantities liberated during an exothermic biochemical reaction in the performance of an energy-absorbing function or operation. Advantageously, this means includes a heat pump.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
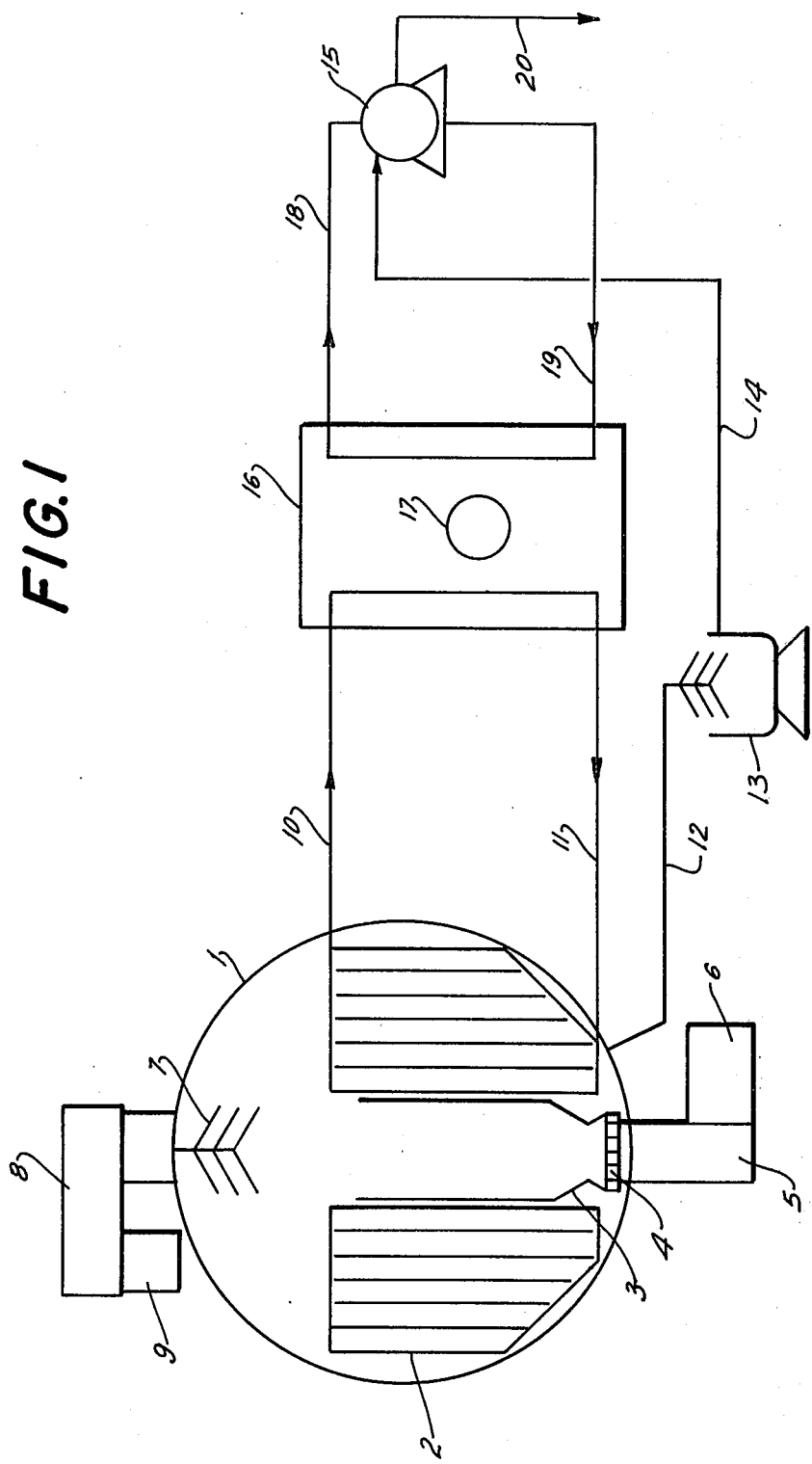
FIG. 1 is a diagrammatic representation of one form of an arrangement according to the invention which may be used for carrying out a process in accordance with the invention.

One important concern of the invention is with a method and an arrangement for the utilization of the heat obtained during reactions in bioreactors, that is, reactors which are adapted for carrying out biochemical reactions. As representatives of biochemical reactions which are capable of yielding heat, there may be mentioned fermentations.

As indicated previously, the heat generated during exothermic biochemical reactions has heretofore been transferred to the surrounding atmosphere unused. The invention intends to provide means which enables at least a portion of this waste heat to be put to good use.

According to one preferred method aspect of the invention, a cooling medium is used to convey the heat quantities liberated during a biochemical reaction away from the bioreactor in which the reaction is carried out. The temperature of the cooling medium is raised by means of a heat pump and the cooling medium is used as an additional energy source in the same process as that which involves the biochemical reaction.

The following Example is intended to be illustrative of this preferred method aspect of the invention and is not to be considered as limiting the invention:

EXAMPLE 1

A fermentation is carried out at temperatures between 40° and 50° C. The fermentation proceeds exothermically thereby yielding quantities of heat. For a working volume of 100 cubic meters in the reactor and a productivity of 5 grams per liter per hour, the order of magnitude of the heat quantities generated is $5.5.10^9$ kilocalories per hour. The heat quantities generated by the fermentation are partially or entirely removed from the reactor by means of a heat pump. The heat quantities removed from the reactor by the heat pump are absorbed by a cooling medium for the reactor prior to being conveyed out of the latter, the cooling medium being vaporized by the absorption of these heat quantities. Using between 4 and 5, the cooling medium is brought to a temperature of 120° C and may thus be made usable for the accessory equipment of the reactor.

The foregoing Example provides an illustration of an embodiment of the invention wherein the cooling medium for the bioreactor is itself raised to a higher temperature level and utilized as an additional energy source. Another preferred embodiment of the invention, as indicated previously, contemplates the transfer of a liberated heat quantity from the cooling medium for the bioreactor to another medium which latter may then be used as an additional energy source.

To obtain a better understanding of the achievement of the invention, it is pointed out that the invention enables a heat quantity liberated during a biochemical reaction to be made usable, for instance, for the accessory or auxiliary equipment of the bioreactor. In the first instance, this involves the drying of the microorganisms which are produced and the sterilization of the nutrient medium introduced into the bioreactor. Furthermore, however, in installations wherein the by-products or waste products obtained during the processing of natural substances are fermented (for example, sugar factories), a portion of the energy recovered from the fermentation may also be used for the operation of parts of the installation which are utilized for the processing, that is, for the production installation arranged upstream of the fermenter. This is true all the more so because most by-products or waste products (such as bagasse or petroleum waste products, for instance) are available to supply the energy required for the operation of a heat pump, that is, to supply energy in such quantities that this energy may be placed in a usable form by means of a heat pump.

The invention will now be further described with reference to the drawing. Referring first to FIG. 1, it is pointed out that this illustrates a bioreactor in combination with a heat pump. The bioreactor is identified with the reference numeral 1 and is here assumed to be in the form of a fermenter vessel. It may be seen that the vessel 1 is provided with cooling elements 2.

A conducting pipe 3 is located intermediate the cooling elements 2. The pipe 3 extends downwardly to a mixer or mixing apparatus 4. In the present instance, the mixer 4 is assumed to be constructed in the form of a pump rotor. The mixer 4 is operated by an electric motor 6 which drives the mixer 4 via a drive mechanism 5.

In the region of the upper portion of the vessel 1, there is provided a mechanical foam breaker or foam separator 7. The foam breaker 7 is driven by an electric motor 9 which acts on the foam breaker 7 via a drive mechanism 8.

The fermentation reaction carried out in the vessel 1 is here assumed to proceed exothermically or, in other words, is here assumed to liberate heat. At least a portion of this heat is absorbed by the cooling medium flowing through the cooling elements 2. In the present instance, it is further assumed that the cooling medium is of the type which is in liquid form upon entering the cooling elements 2 and which is vaporized by the absorption of heat in the vessel 1.

A conduit 11 communicates with the cooling elements 2 and, as indicated by the arrow in the conduit 11, the cooling medium enters the cooling elements 2 via this conduit. As just mentioned, the cooling medium is in the form of a liquid at the time that it enters the cooling elements 2 from the conduit 11.

A conduit 10 also communicates with the cooling elements 2 and, as may be seen from the arrow in this conduit, the cooling medium is withdrawn from the cooling elements 2 through the conduit 10. As indicated above, the cooling medium is in vaporized form upon being withdrawn from the cooling elements 2 via the conduit 10.

Both the conduit 10 and the conduit 11 communicate with a heat pump 16. The latter is provided with a drive arrangement 17.

It may be seen that a conduit 18 also communicates with the pump 16. As shown, the conduit 18 leads to a dryer 15 which may, for instance, be a vacuum dryer. A conduit 19 leads from the dryer 15 to the pump 16. A suitable heating medium for the dryer 15 circulates through the conduits 18 and 19 via the pump 16 and the dryer 15.

In operation, an exothermic fermentation reaction is carried out in the vessel 1 and it will be understood that the mixer 4 and the foam breaker 7 are operated as required. Since the operation of the mixer 4 and the foam breaker 7 are well-known to those skilled in the art, this will not be described here. The cooling medium enters the cooling elements 2 via the conduit 11 and thus absorbs heat liberated by the fermentation reaction. As a result of this heat absorption, vaporization of the cooling medium occurs in the cooling elements 2. The vaporized cooling medium is withdrawn from the cooling elements 2 via the conduit 10 and conveyed to the pump 16. In the pump 16, the cooling medium is compressed and also gives up heat absorbed thereby in the cooling elements 2. The compressed and cooled cooling medium is then returned to the cooling elements 2 through the conduit 11.

At the same time, the heating medium for the dryer 15 enters the pump 16 through the conduit 19 as indicated by the arrow in this conduit. In the pump 16, the heating medium is heated. The heated medium leaves the pump 16 via the conduit 18 as illustrated by the arrow in the latter conduit and is conveyed to the dryer 15. In the dryer 15, the heating medium gives up heat. The thus-cooled heating medium is then returned to the pump 16 through the conduit 19.

The biological mass obtained by virtue of the fermentation reaction is withdrawn from the vessel 1 via a conduit 12. The conduit 12 leads to a centrifuge 13 wherein the mass is concentrated. The concentrated product leaves the centrifuge 13 via a conduit 14 through which it is conveyed to the dryer 15 for drying. The dried product is withdrawn from the dryer 15 through a conduit 20.

It will be seen that heat liberated by the fermentation reaction is used in the drying of the product obtained from this reaction.

It is pointed out that the embodiment of FIG. 1 illustrates an arrangement wherein heat liberated by a biochemical reaction is transferred from a cooling medium to another medium, namely, the heating medium. However, it is possible to eliminate the heating medium and to use the cooling medium both for the removal of heat from the vessel 1 and for drying in the dryer 15. This situation may be visualized, for example, by considering the two circuits comprising the conduits 10, 11 and 18, 19, respectively, as being replaced by a single circuit extending from the exit of the cooling elements 2 through the pump 16 to the dryer 15 and back to the entrance of the cooling elements 2 through the pump 16. In such an event, the temperature of the cooling medium coming from the cooling elements 2 would be increased by the pump 16 prior to admission of the cooling medium into the dryer 15.

Figure 2:
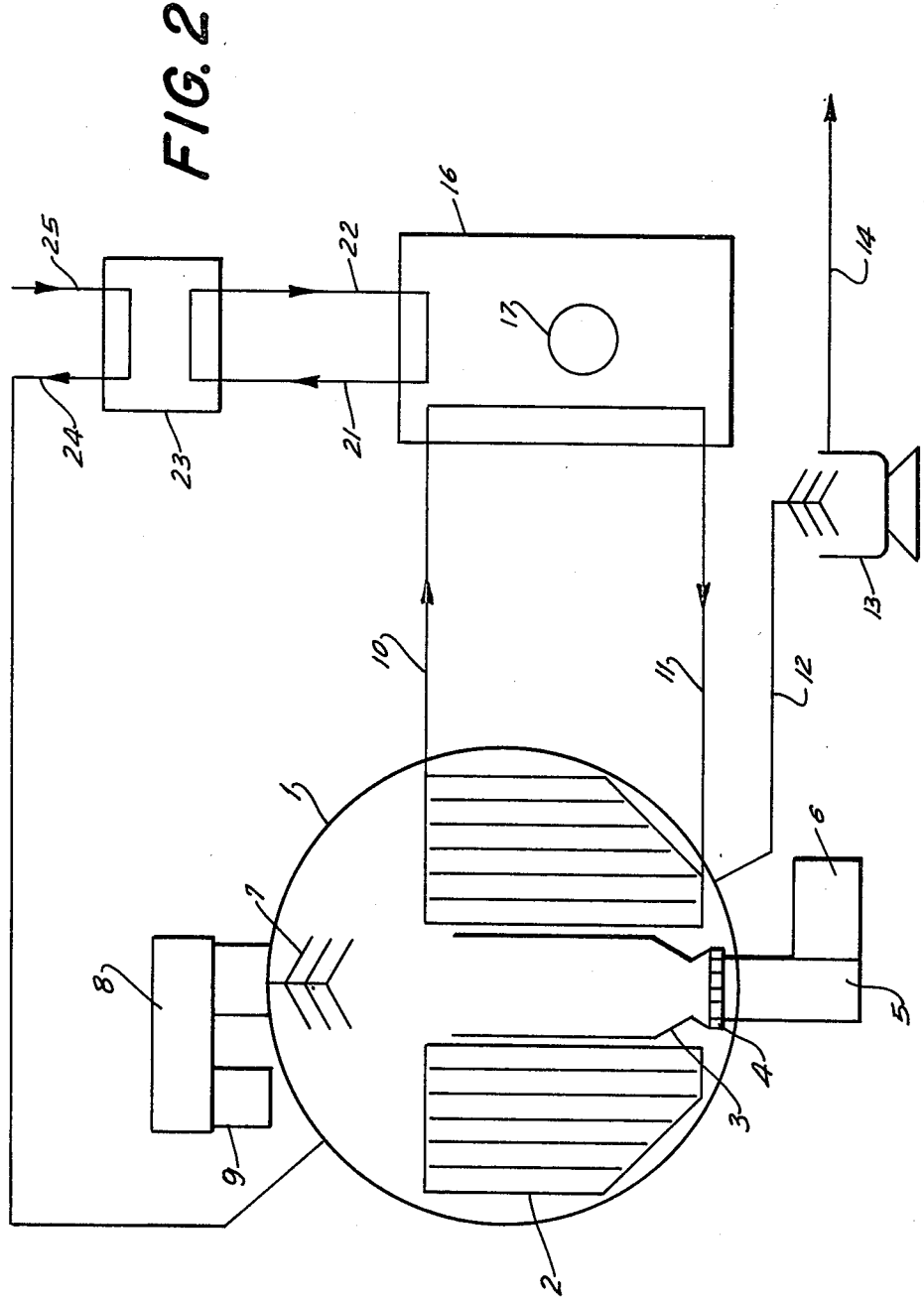
FIG. 2 is a diagrammatic representation of another form of arrangement in accordance with the invention which may be used for carrying out a process according to the invention.

The considerations outlined above with respect to FIG. 1 also apply to FIG. 2 wherein the same reference numerals have been used to denote similar components. FIG. 2 illustrates that heat liberated by the fermentation reaction may also, with the aid of the heat pump 16, be used to heat a substrate medium which is utilized for the fermentation reaction. The heating of the substrate medium may be performed concomitantly with or independently of the drying of the fermentation product in the dryer 15. For the sake of clarity, the dryer 15 has not been illustrated in FIG. 2.

The embodiment of FIG. 2 is similar to that of FIG. 1 in most respects. However, the conduits 18 and 19 for the heating medium of FIG. 1 have been omitted in FIG. 2 for the same reason that the dryer 15 has not been shown. Nevertheless, the embodiment of FIG. 2 includes conduits 21 and 22 for a heating medium. As indicated by the arrows in the latter conduits, the heating medium enters the pump 16 via the conduit 22 and leaves the pump 16 through the conduit 21. It may be seen that the conduit 21 and the conduit 22 both extend into a heat-exchanger 23.

The operation of the embodiment of FIG. 2 with respect to the cooling medium is, as already indicated, here assumed to be the same as that of FIG. 1 and, therefore, this need not again be described. Referring now to that part of the embodiment of FIG. 2 which does not correspond to FIG. 1, it is pointed out of the heating medium enters the pump 16 via the conduit 22. In the pump 16, the heating medium is heated. The heated heating medium leaves the pump 16 through the conduit 21 and is conveyed to the heat-exchanger 23. In the heat-exchanger 23, the heating medium gives up heat and is thereby cooled. The thus-cooled heating medium then returns to the pump 16 via the conduit 22.

The substrate for the fermentation reaction is introduced into the heat-exchanger 23 through a conduit 25. The substrate is then heated in the heat-exchanger 23 by the heat given up by the heating medium since the circuit for the heating medium and the conduit for the substrate are arranged in heat-exchange relationship. As a result of the heating of the substrate, the latter is sterilized.

The sterilized is withdrawn from the heat-exchanger 23 through a conduit 24. From the conduit 24, the sterilized substrate is admitted into the vessel 1. The heat-exchanger 23 is designed in such a manner that the substrate may be brought to the correct temperature prior to the introduction thereof into the vessel 1.

It may be emphasized that the dryer 15 could be additionally provided in the embodiment of FIG. 2 if desired.

The following Example is intended to further illustrate the method aspect of the invention wherein heat liberated during a biochemical reaction is transferred from a cooling medium to another medium. This Example, which will be understood as being non-limiting for the invention, is based on the embodiment of FIG. 1.

EXAMPLE 2

The gas of the vaporized cooling medium which exits from the cooling elements 2 leaves the latter via the conduit 10 at a temperature between 25° and 30° C. The gas is liquefied by the heat pump 16 and returns to the cooling elements 2 through the conduit 11 at a temperature between 10° and 25° C. In the cooling elements 2, renewed vaporization of the liquefied gas occurs.

On the other hand, the heating medium for the dryer 15 is heated to a temperature between 70° and 110° C in the heat pump 16. The heating medium is then conveyed to the dryer 15 via the conduit 18 and, by virtue of the drying operation, is cooled to a temperature between 50° and 90° C. Thereafter, the heating medium is returned to the heat pump 16 through the conduit 19.

It will be understood that each of the elements described above, or two or more together, may also find a useful application in other types of processes and arrangements differing from the types described above.

While the invention has been illustrated and described as embodied in a method and an arrangement for utilizing the heat liberated during a fermentation reaction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an exothermic reaction process for growing mico-organisms in a culture medium contained in a vessel, the improvement which comprises the steps of circulating through the contents of the vessel a vaporizable cooling medium in a close path so that the vaporizable cooling medium remains separate from but passes into heat-exchange relationship with the culture medium so as to be vaporized by the heat liberated by the micro-organisms; conveying the vaporized medium away from the vessel in said path to a predetermined location; and liberating heat at said location so as to perform a heating function, by compressing the vaporized medium in a portion of said path so as to increase the thermal energy of the vaporized medium which is available for the heating function.

2. A process as defined in claim 1, said heat liberated by the microorganisms being absorbed by the vaporizable cooling medium for dissipating heat liberated during said exothermic reaction; and wherein the temperature of said varporizable cooling medium is increased subsequent to the absorption of said heat thereby and prior to utilization of said heat in performing said heating function.

3. A process as defined in claim 1,. wherein said step of compressing causes condensation of said vaporizable cooling medium.

4. A process as defined in claim 2, wherein the temperature of said varporizable cooling medium is increased by means of a heat pump.

5. A process as defined in claim 1, said heat liberated by the microorganisms, being absorbed by the cooling medium for dissipating heat liberated during said exotermic reaction; and wherein said heat is transferred form said cooling medium to another medium and said transferred heat is thereafter utilized in performing said heating function.

6. A process as defined in claim 1, wherein said heat liberated by the microorganisms is utilized as an additional energy source in said process.

7. A process as defined in claim 1, said exothermic reaction being effective for forming a liquid-containing product; amd wherein said heating function comprises removing liquid from said product.

8. A process as defined in claim 7, wherein said liquid comprises water.

9. A process as defined in claim 7, wherein the removal of liquid from said product is carried out in a vacuum.

10. A process as defined in claim 1, said exothermic reaction being carried out on a substrate; and wherein said heating function comprises sterilization of said substrate.

11. A process as defined in claim 1, said exothermic reaction being carried out in a bioreactor having associated with it at least one energy-absorbing accessory; and wherein said heat liberated by the microorganisms is utilized in the operation of said accessory.

12. In a process which includes an exothermic biochemical reaction, the improvement which comprises absorbing a heat quantity by a cooling medium for dissipating heat liberated during the biochemical reaction; transferring the heat quantity from the cooling medium to another medium; and thereafter performing a heating function by utilizing the heat quantity transferred to said other medium.

13. A process as defined in claim 12, said cooling medium being vaporized during absorption of said heat quantity; and wherein said cooling medium is compressed and condensed for transfer of said heat quantity to said other medium.

14. A process as defined in claim 12, wherein the transfer of said heat quantity is effected by means of a heat pump.

15. In an arrangement for growing micro-organisms, a combination comprising a vessel for containing a culture medium and the microorganisms which are biochemically grown in the latter with attendant liberation of heat; means for circulating through the contents of the vessel a vaporizable cooling medium in a closed path so that the vaporizable cooling medium remains separate from but passes into heat-exchange relationship with the culture medium so as to be vaporized by the heat liberated by the micro-organisms; means for conveying the vaporized medium away from the vessel in said path to a predetermined location; and means for liberating heat at said location so as to perform a heating function, including means for compressing the vaporized medium in a portion of said path so as to increase the thermal energy of the vaporized medium which is available for the heating function.

16. An arrangement as defined in claim 15; said compressing means comprising a heat pump for compressing the vaporizable medium.

17. An arrangement as defined in claim 15; and further comprising another medium in indirect heat-transfer relationship with said vaporizable cooling medium so as to be heated by the latter, and means for transporting said heated other medium towards said predetermined location at which said heating function is to be performed.

* * * * *